(12) United States Patent
Takahashi et al.

(10) Patent No.: US 11,757,373 B2
(45) Date of Patent: Sep. 12, 2023

(54) POWER CONVERTER

(71) Applicant: DENSO CORPORATION, Kariya (JP)

(72) Inventors: Yoshimitsu Takahashi, Nisshin (JP);
Makoto Taniguchi, Kariya (JP)

(73) Assignee: DENSO CORPORATION, Kariya (JP)

( * ) Notice: Subject to any disclaimer, the term of this patent is extended or adjusted under 35 U.S.C. 154(b) by 274 days.

(21) Appl. No.: 17/339,279

(22) Filed: Jun. 4, 2021

(65) Prior Publication Data

US 2021/0297006 A1 Sep. 23, 2021

Related U.S. Application Data

(63) Continuation of application No. PCT/JP2019/045993, filed on Nov. 25, 2019.

(30) Foreign Application Priority Data

Dec. 4, 2018 (JP) ................................. 2018-227259

(51) Int. Cl.
*H02M 7/5387* (2007.01)
*H02M 1/00* (2006.01)
*H02M 1/088* (2006.01)
*H02M 3/158* (2006.01)
*H02M 7/537* (2006.01)
(Continued)

(52) U.S. Cl.
CPC ..... *H02M 7/53871* (2013.01); *H02M 1/0048* (2021.05); *H02M 1/088* (2013.01); *H02M 3/158* (2013.01); *H02M 7/493* (2013.01); *H02M 7/537* (2013.01); *H02M 1/0003* (2021.05); *H02M 1/08* (2013.01)

(58) Field of Classification Search
None
See application file for complete search history.

(56) References Cited

U.S. PATENT DOCUMENTS 8,344,677 B2 * 1/2013 Takizawa ................ H02M 1/32
318/500
2018/0375457 A1 * 12/2018 Kitamura ............. B62D 5/0463
(Continued)

FOREIGN PATENT DOCUMENTS

| JP | 2017-093077 A | 5/2017 | |
| WO | WO-2017150641 A1 * | 9/2017 | ........... B62D 5/0457 |
| WO | WO-2019044112 A1 * | 3/2019 | ............. B60R 16/02 |

*Primary Examiner* — Matthew V Nguyen
(74) *Attorney, Agent, or Firm* — Oliff PLC

(57) ABSTRACT

In a power converter for converting DC power from a DC power source into AC power and supplying the AC power to a single-phase winding or multi-phase windings, a controller controls first and second inverter circuits and performs first power conversion control to lock open/closed states of switching elements in the second inverter circuit and switch open/closed states of switching elements in the first inverter circuit, and second power conversion control to lock open/closed states of the switching elements in the first inverter circuit and switch open/closed states of the switching elements in the second inverter circuit. The controller is configured to perform either the first power conversion control or the second power conversion control when an effective value of drive current through each winding is less than a threshold, and otherwise switch between the first power conversion control and the second power conversion control.

6 Claims, 9 Drawing Sheets

(51) Int. Cl.
*H02M 7/493* (2007.01)
*H02M 1/08* (2006.01)

(56) References Cited

U.S. PATENT DOCUMENTS

| | | | |
|---|---|---|---|
| 2019/0372501 A1* | 12/2019 | Wada | H02M 7/5387 |
| 2020/0195166 A1* | 6/2020 | Horiuchi | B62D 6/00 |
| 2020/0274461 A1* | 8/2020 | Koikegami | B62D 6/00 |

* cited by examiner

POWER CONVERTER

CROSS-REFERENCE TO RELATED APPLICATION

This application is based on Japanese Application No. 2018-227259 filed on Dec. 4, 2018, the contents of which are incorporated herein by reference.

BACKGROUND

Technical Field

This disclosure relates to a power converter.

Related Art

Conventionally, an open-end winding system that drives a three-phase induction electric motor or the like is known. In the known open-end winding system, the inverter circuit in which switching is performed is switched between a first inverter circuit and a second inverter circuit. This can prevent losses (appearing as heat generation) from concentrating in one of the first and second inverter circuits. That is, it is possible to suppress an increase in the temperature of switching circuits in one of the inverter circuits as compared with switching circuits in the other of the inverter circuits.

BRIEF DESCRIPTION OF THE DRAWINGS

In the accompanying drawings.

DESCRIPTION OF SPECIFIC EMBODIMENTS

Figure 1:
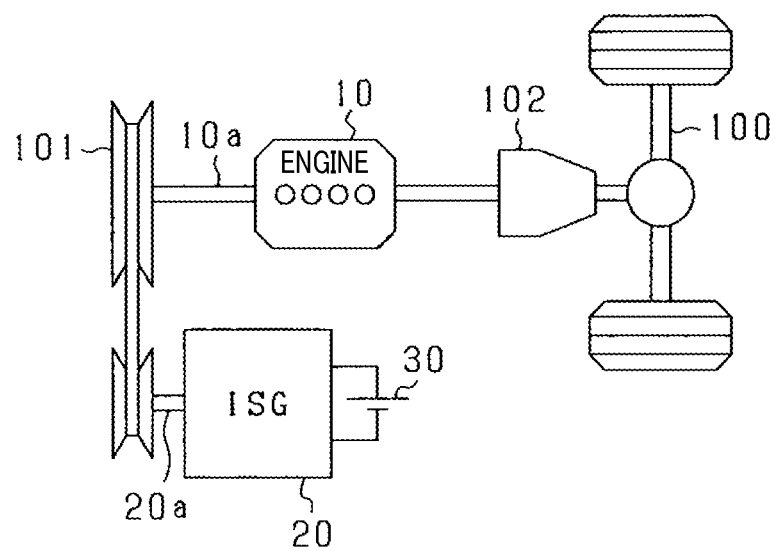
FIG. 1 is a schematic diagram of a drive system.

In the above open-end winding system, as disclosed in JP-A-2017-93077, losses may occur due to control deviations when the inverter circuit in which switching elements are switched on and off is switched between the first inverter circuit and the second inverter circuit, which gives rise to an inefficiency issue.

In view of the above, it is desired to have a power converter capable of appropriately distributing losses while suppressing the losses.

One aspect of this disclosure provides a power converter for converting direct-current (DC) power from a DC power source into alternating-current (AC) power and supplying the AC power to a single-phase winding or multi-phase windings. The power converter includes: a first inverter circuit configured to be electrically connected to a first end of each winding and configured to transfer electrical power from the DC power source to the first end of the winding; a second inverter circuit configured to be electrically connected to a second end of each winding and configured to transfer electrical power from the DC power source to the second end of the winding; and a controller configured to control the first inverter circuit and the second inverter circuit and operable to perform first power conversion control to lock open/closed states of switching elements in the second inverter circuit and switch open/closed states of switching elements in the first inverter circuit, and second power conversion control to lock open/closed states of switching elements in the first inverter circuit and switch open/closed states of switching elements in the second inverter circuit. The controller is configured to perform either the first power conversion control or the second power conversion control when an effective value of drive current through each winding is less than a threshold, and switch between the first power conversion control and the second power conversion control when the effective value of drive current through each winding is equal to or greater than the threshold.

When switching between the first power conversion control and the second power conversion control, extra losses may be generated due to switching timing misalignment. These losses appear as heat generation. When the effective value of drive current is equal to or greater than the threshold, the conduction loss in the switching element that is locked in the closed state will become equal to or greater than the loss in each of the switching elements whose open/closed states are switched. Thus, the temperature of the switching element that is locked in the closed state may become extremely high as compared with temperatures of the switching elements whose open/closed states are switched.

To address such an issue, when the effective value of drive current is equal to or greater than the threshold, the first power conversion control and the second power conversion control are switched to change the switching element to be locked in the closed state, thereby preventing concentration of heat generation. When the effective value of drive current is less than the threshold, either the first power conversion control or the second power conversion control is performed to suppress the losses that are generated upon switching between the first power conversion control and the second power conversion control.

One embodiment where the power converter according to this disclosure is applied to a vehicle drive system including an engine and a rotating electric machine as prime movers will now be described with reference to the accompanying drawings.

Figure 2:
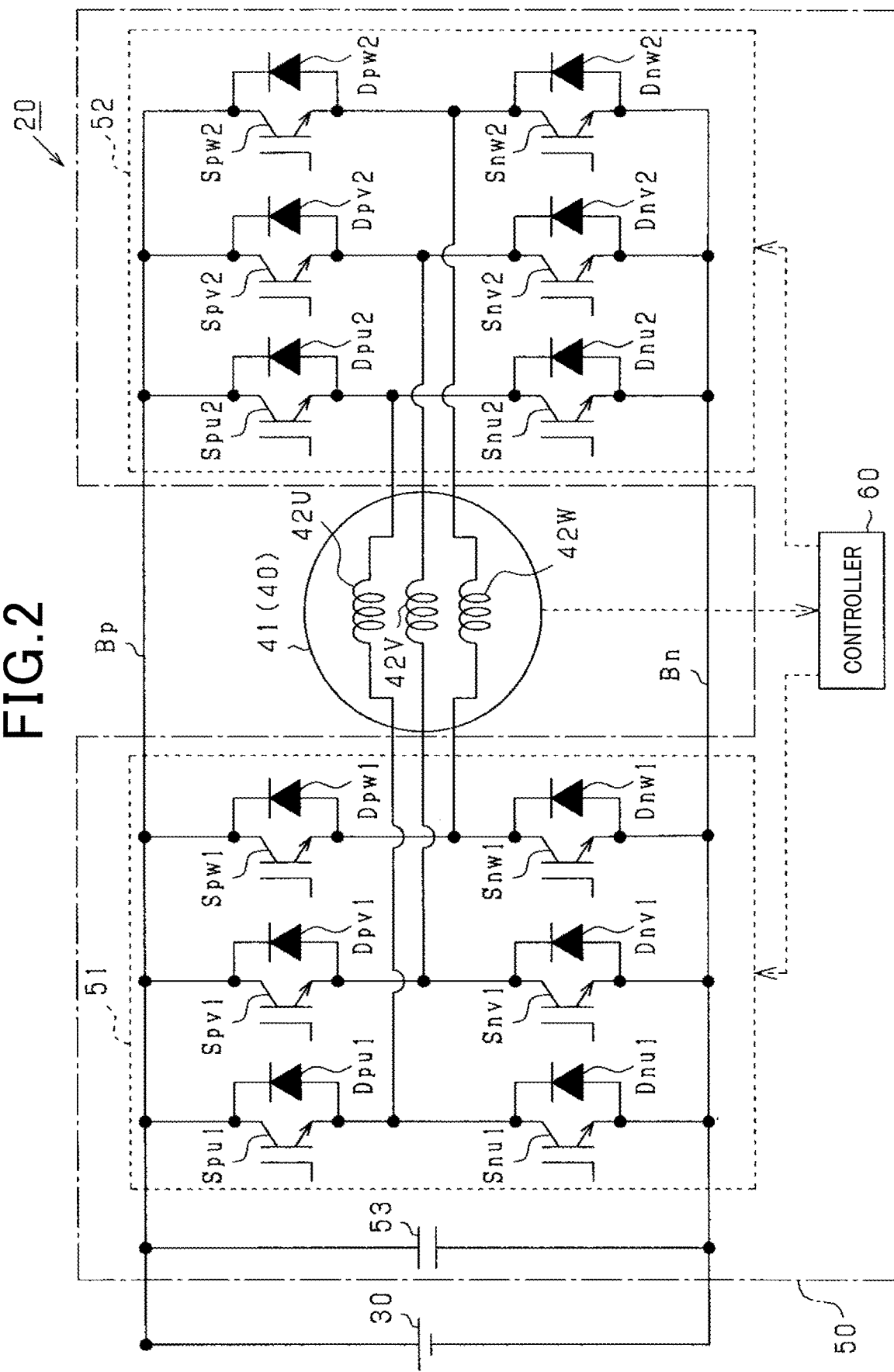
FIG. 2 is a circuit diagram illustrating an electric configuration of an integrated starter generator (ISG)

As illustrated in FIG. 1, a vehicle includes an engine 10, an integrated starter generator (ISG) 20, and a battery 30 as a DC power source. In the present embodiment, as illustrated in FIG. 2, the ISG 20 is configured to serve not only as a motor 40 as a rotating electric machine, but also as an inverter 50 as a power converter.

The motor 40 is specifically a permanent magnet synchronous machine including three-phase windings. The motor 40 may be a wound field synchronous machine. As illustrated in FIG. 1, a rotary shaft 20a of the ISG 20 (that is, a rotary shaft 20a of the motor 40) is connected to a crank shaft 10a of the engine 10 as an internal combustion engine via a linkage 101 such as a pulley, such that driving force is transmitted to the crank shaft 10a of the engine 10.

The crankshaft 10a of the engine 10 is connected to an axle 100 via a linkage 102 such as a transmission. The ISG 20 has a power running function of applying driving force (rotational force) to the crankshaft 10a. The battery 30 includes a rechargeable secondary battery, more specifically, a lithium-ion battery.

An electrical configuration of a drive system will now be described with reference to FIG. 2.

In FIG. 2, three-phase windings 41 are shown as stator windings of the motor 40. The three-phase windings 41 include a U-phase winding 42U, a V-phase winding 42V, and a W-phase winding 42W. In the present embodiment, the U-phase winding 42U, the V-phase winding 42V, and the W-phase winding 42W are arranged such that their phases are shifted relative to each other by an electrical angle of 120 degrees.

The inverter 50 includes a first inverter circuit 51, a second inverter circuit 52, a smoothing capacitor 53, and a controller 60. The inverter 50 employs a so-called open-end winding system. In the present embodiment, each of the first inverter circuit 51 and the second inverter circuit 52 is a three-phase inverter.

The battery 30 and the capacitor 53 are connected in parallel with each of the first inverter circuit 51 and the second inverter circuit 52. More specifically, high-side terminals of the first inverter circuit 51, the second inverter circuit 52, and the capacitor 53 are connected to a positive bus Bp (or a positive bus bar) connected to a positive terminal of the battery 30. Low-side terminals of the first inverter circuit 51, the second inverter circuit 52, and the capacitor 53 are connected to a negative bus Bn (or a negative bus bar) connected to a negative terminal of the battery 30.

The first inverter circuit 51 and the second inverter circuit 52 form as many full-bridge circuits as the number of phases of the three-phase windings 41. The drive current (energization current) is adjusted for each phase winding (that is, each of a U-phase winding 42U, a V-phase winding 42V, and a W-phase winding 42W) by switching on and off a switching element provided along each arm.

More specifically, the first inverter circuit 51 includes a series connection of an upper arm switch Spu1 and a lower arm switch Snu1 of the U-phase, a series connection of an upper arm switch Spv1 and a lower arm switch Sny1 of the V-phase, and a series connection of an upper arm switch Spw1 and a lower arm switch Snw1 of the W-phase. In the present embodiment, a voltage-controlled semiconductor switching element, more specifically, an insulated gate bipolar transistor (IGBT), is used as each of the upper arm switches Spu1, Spv1, Spw1 of the respective phases and the lower arm switches Snu1, Sny1, Snw1 of the respective phases. Instead of the IGBTs, the metal-oxide semiconductor field-effect transistors (MOSFETs) may be used. Freewheel diodes of the respective phases Dpu1, Dpv1, Dpw1 are connected in anti-parallel with the upper arm switches Spu1, Spv1, Spw1, respectively. Freewheel diodes of the respective phases Dnu1, Dnv1, Dnw1 are connected in anti-parallel with the lower arm switches Snu1, Snv1, Snw1, respectively.

High-side terminals (collectors) of the upper arm switches Spu1, Spv1, and Spw1 of the respective phases are connected to the positive terminal of battery 30 via the positive bus Bp. Low-side terminals (emitters) of the lower arm switches Snu1, Snv1, Snw1 of the respective phases are connected to the negative terminal (ground) of battery 30 via the negative bus Bn. A first end of each of the U-phase winding 42U, the V-phase winding 42V, and the W-phase winding 42W is connected to a midpoint between the upper arm switch and the lower arm switch of the corresponding phase.

That is, the first end of the U-phase winding 42U is connected to the midpoint between the upper arm switch Spu1 and the lower arm switch Snu1 of the U-phase. The first end of the V-phase winding 42V is connected to the midpoint between the upper arm switch Spv1 and the lower arm switch Snv1 of the V-phase. The first end of the W-phase winding 42W is connected to the midpoint between the upper arm switch Spw1 and the lower arm switch Snw1 of the W-phase.

The second inverter circuit 52 is similar in configuration to the first inverter circuit 51. That is, the second inverter circuit 52 includes a series connection of an upper arm switch Spu2 and a lower arm switch Snug of the U-phase, a series connection of an upper arm switch Spv2 and a lower arm switch Snv2 of the V-phase, and a series connection of an upper arm switch Spw2 and a lower arm switch Snw2 of the W-phase. Freewheel diodes of the respective phases Dpu2, Dpv2, Dpw2 are connected in anti-parallel with the upper arm switches Spu2, Spv2, Spw2, respectively. Freewheel diodes of the respective phases Dnu2, Dnv2, Dnw2 are connected in anti-parallel with the lower arm switches Snu2, Snv2, Snw2, respectively.

High-side terminals (collectors) of the upper arm switches Spu2, Spv2, and Spw2 of the respective phases are connected to the positive terminal of the battery 30 via the positive bus Bp. Low-side terminals (emitters) of the lower arm switches Snu2, Snv2, Snw2 of the respective phases are connected to the negative terminal (ground) of the battery 30 via the negative bus Bn. A second end of each of the U-phase winding 42U, the V-phase winding 42V, and the W-phase winding 42W is connected to a midpoint between the upper arm switch and the lower arm switch of the corresponding phase.

That is, the second end of the U-phase winding 42U is connected to the midpoint between the upper arm switch Spu2 and the lower arm switch Snu2 of the U-phase. The second end of V-phase winding 42V is connected to the midpoint between the upper arm switch Spv2 and the lower arm switch Snv2 of the V-phase. The second end of the W-phase winding 42W is connected to the midpoint between the upper arm switch Spw2 and the lower arm switch Snw2 of the W-phase.

The controller 60 includes a microcomputer formed of a CPU and various memories, and is powered by switching on and off the switching elements in the first inverter circuit 51 and the second inverter circuit 52 based on various detection information of the ISG 20 and a demand for power-running driving. The detection information of the ISG 20 includes an angle of rotation (electrical angle information) of a rotor (the rotary shaft 20a) of the motor 40, a power source voltage (an inverter input voltage) detected by a voltage sensor, and a drive current (an energization current) of each phase detected by a current sensor.

The controller 60 generates and outputs operation signals for operating the respective switching elements in the first inverter circuit 51 and the second inverter circuit 52, thereby converting the direct-current (DC) power input from the battery 30 into alternating-current (AC) power and supplying the AC power to the respective phase windings 42U, 42V, and 42W.

More specifically, the controller 60 locks the open/closed states (or on/off states) of the respective switching elements that constitute one of the inverter circuits 51 and 52 while switching the open/closed states of the respective switching elements that constitute the other of the inverter circuits 51 and 52, thereby implementing power conversion control.

Figure 3A:
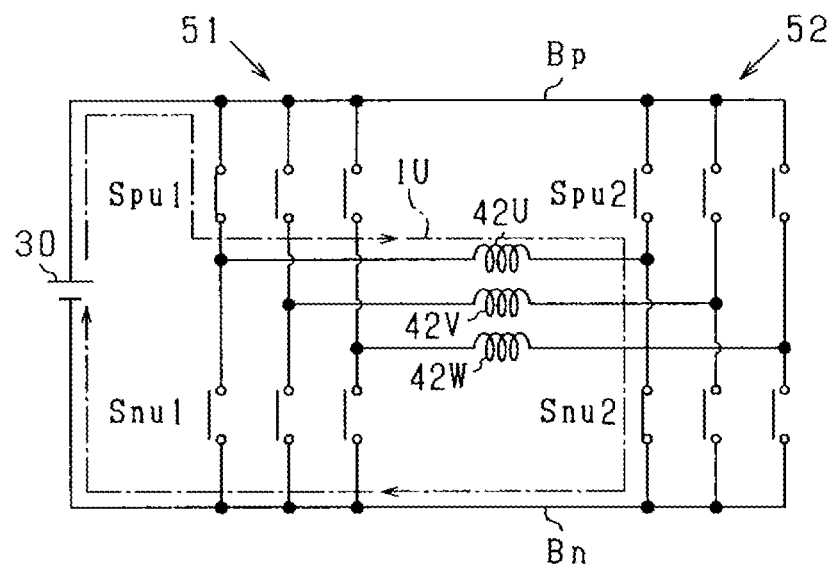
FIGS. 3A and 3B are a circuit diagram illustrating a current flow during first power conversion control.
Figure 3B:
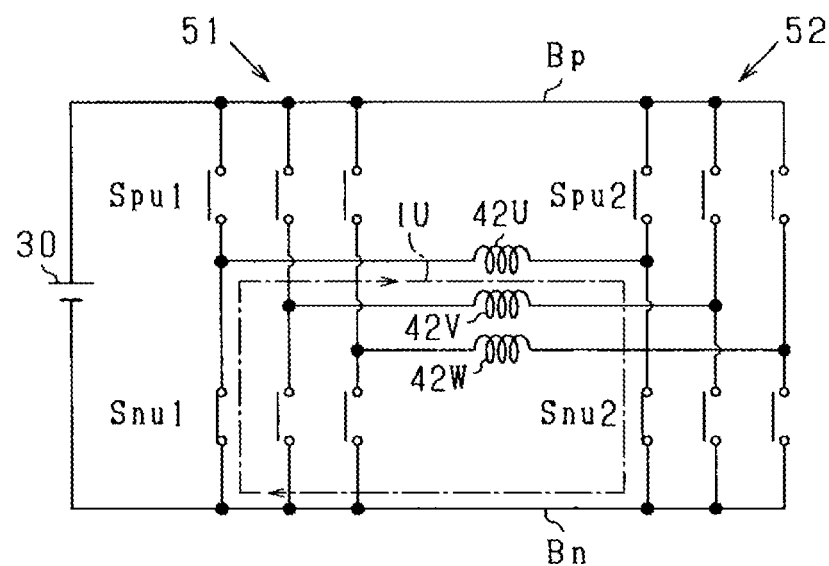

For example, as illustrated in FIG. 3, the controller 60 switches the open/closed states of the upper arm switch Spu1 and the lower arm switch Snu1 while locking the upper arm switch Spu2 in the open state (the off state or the nonconducting state) and the lower arm switch Snu2 in the closed state (the on state or the conducting state), thereby passing the drive current through the U-phase winding 42U. The DC power is converted into the AC power by appropriately changing a percent per second (i.e., a duty cycle) in which each of the upper arm switch Spu1 and the lower arm switch Snu1 is in the closed state. In FIG. 3, the drive current "IU" through the U-phase winding 42U is indicated by the dashed-dotted line.

Reversing the direction of the drive current may be implemented by locking the upper arm switch Spu2 in the closed state and the lower arm switch Snu2 in the open state. The same applies to control of the drive current flowing through each of the V-phase winding 42V and the W-phase winding 42W.

FIG. 3 illustrates first power conversion control in which the open/closed states of the switching elements in the first inverter circuit 51 are switched while the open/closed states of the switching elements in the second inverter circuit 52 are locked.

The first power conversion control includes first-A power conversion control in which the open/closed states of the upper arm switch Spu1 and the lower arm switch Snu1 in the first inverter circuit 51 are switched therebetween while the upper arm switch Spu2 in the second inverter circuit 52 is locked in the closed state and the lower arm switch Snu2 in the second inverter circuit 52 is locked in the open state. The first power conversion control includes first-B power conversion control in which the open/closed states of the upper arm switch Spu1 and the lower arm switch Snu1 in the first inverter circuit 51 are switched therebetween while the upper arm switch Spu2 in the second inverter circuit 52 is locked in the open state and the lower arm switch Snu2 in the second inverter circuit 52 is locked in the closed state.

In the first power conversion control, when the direction of the drive current is changed (from positive to negative or from negative to positive), the open/closed states of the switching elements in the second inverter circuit 52 are switched therebetween. That is, the first-A power conversion control and the first-B power conversion control are switched depending on the direction of the drive current.

When performing the first-B power conversion control illustrated in FIG. 3, the drive current flows through the lower arm switch Snu2 while no drive current flows through the upper arm switch Spu2. The drive current intermittently flows through each of the upper arm switch Spu1 and the lower arm switch Snu1. Therefore, continuing the above first-B power conversion control may lead to a larger loss in the lower arm switch Snug than in the upper arm switch Spu2, the upper arm switch Spu1, and the lower arm switch Snu1 depending on the magnetite of the drive current. Since the losses appear as heat generation, the heat generation may be concentrated in the lower arm switch Snug. Thus, the temperature of the lower arm switch Snug may become higher than temperatures of the other switching elements.

Figure 4A:
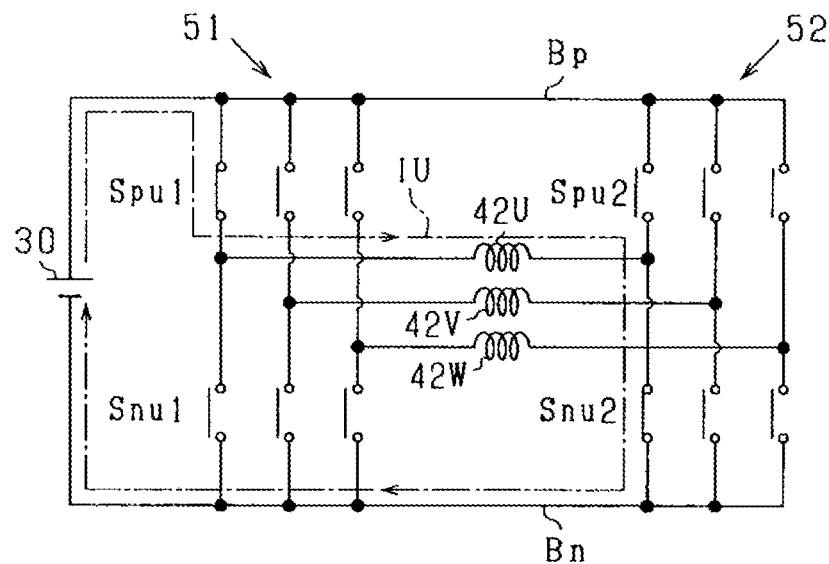
FIGS. 4A and 4B are a circuit diagram illustrating a current flow during second power conversion control.
Figure 4B:
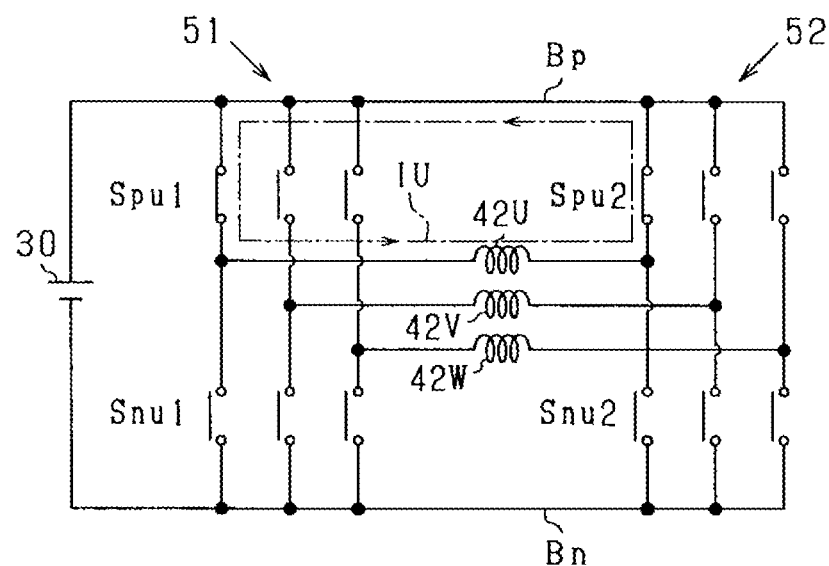

Conventionally, the inverter circuit in which the open/closed states of the switching elements are locked is switched between the inverter circuits 51 and 52. For example, the controller 60 may alternately perform the first power conversion control as illustrated in FIG. 3 and the power conversion control (second power conversion control) as illustrated in FIG. 4. In the power conversion control as illustrated in FIG. 4, the upper arm switch Spu1 is locked in the closed state and the lower arm switch Snu1 is locked in the open state while the open/closed states of the upper arm switch Spu2 and the lower arm switch Snug are switched therebetween, thereby passing the drive current through the U-phase winding 42U. The switching element which is locked in the closed state is thus regularly changed, which prevent heat generation from being concentrated in a specific one of the switching elements.

In the power conversion control as illustrated in FIG. 4, the direction of the drive current may be reversed by locking the upper arm switch Spu1 in the open state and the lower arm switch Snu1 in the closed state. The same applies to power conversion control to be performed over the V-phase winding 42V and the W-phase winding 42W.

FIG. 4 illustrates second power conversion control in which the open/closed states of the switching elements in the second inverter circuit 52 are switched therebetween while the open/closed states of the switching elements in the first inverter circuit 51 are locked.

The second power conversion control includes second-A power conversion control in which the open/closed states of the upper arm switch Spu2 and the lower arm switch Snu2 in the second inverter circuit 52 are switched therebetween while the upper arm switch Spu1 in the first inverter circuit 52 is locked in the closed state and the lower arm switch Snu1 in the first inverter circuit 51 is locked in the open state. The second power conversion control includes second-B power conversion control in which the open/closed states of the upper arm switch Spu2 and the lower arm switch Snu2 in the second inverter circuit 52 are switched therebetween while the upper arm switch Spu1 in the first inverter circuit 51 is locked in the open state and the lower arm switch Snu1 in the first inverter circuit 51 is locked in the closed state.

In the second power conversion control, when the direction of the drive current is changed (from positive to negative or from negative to positive), the open/closed states of the switching elements in the first inverter circuit 51 are switched therebetween. That is, the second-A power conversion control and the second-B power conversion control are switched therebetween depending on the direction of the drive current.

The same applies to power conversion control to be performed over the V-phase winding 42V and the W-phase winding 42W.

Figure 5:
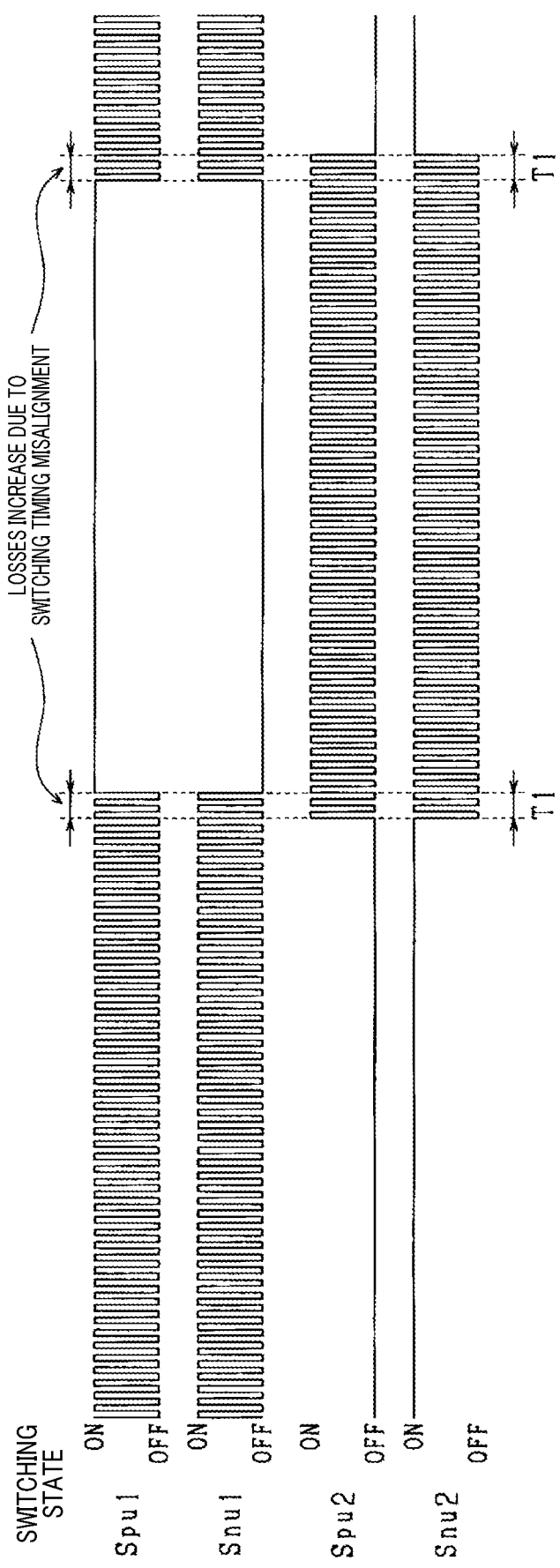
FIG. 5 is an illustration of an overlap time period during which switching losses are generated in overlap.

When switching between the first power conversion control and the second power conversion control, it is necessary to prevent the drive current flowing through each of the phase windings 42U, 42V, 42W from being interrupted. To this end, as illustrated in FIG. 5, both the first inverter circuit 51 and the second inverter circuit 52 have an overlap time period T1 during which the open/closed states of the upper arm switches Spu1 and Spu2 and the lower arm switches Snu1 and Snug are switched.

Given such an overlap time period T1, current may flow through where the current does not need to flow, and extra losses may thus be generated. More specifically, in the respective switching elements in the first inverter circuit 51 and the second inverter circuit 52, switching losses may occur in overlapping fashion, and the total loss in the inverter 50 may increase.

In view of the above, in the present embodiment, the controller 60 performs either the first power conversion control or the second power conversion control when the effective value of drive current is less than a threshold, and switches between the first power conversion control and the second power conversion control when the effective value is equal to or greater than the threshold.

More specifically, the loss generated in each of the switching elements whose open/closed states are switched can be divided into the switching loss and the conduction loss. The switching losses are caused by switching between the open/closed states (generated in the transient state in switching operation) of the switching elements. The conduction losses are caused by passing the current through the switching elements. Only the conduction loss is generated in the switching element that is locked in the closed state.

Figure 6A:
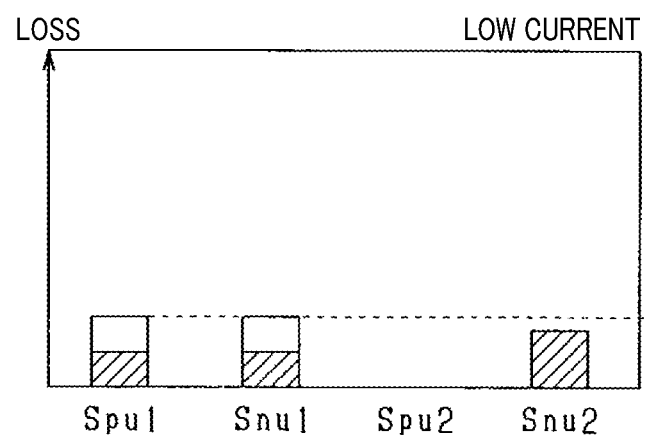
FIGS. 6A and 6B are an illustration of losses generated in respective switching elements in a conventional technique.
Figure 6B:
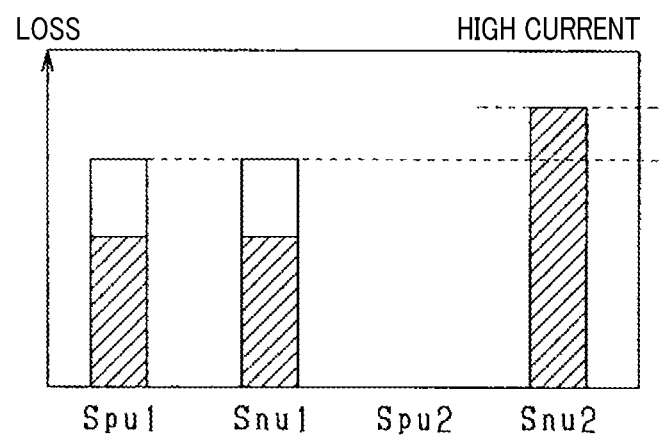

FIGS. 6A and 6B each illustrate an example breakdown of the losses generated in the switching elements when only the first-B power conversion control is performed (as in the conventional method). In FIGS. 6A and 6B, switching losses are indicated by the open regions, and conduction losses are indicated by the hatched regions. As illustrated in FIGS. 6A and 6B, when only the first-B power conversion control is performed, the switching loss and the conduction loss are both generated in each of the upper arm switch Spu1 and the lower arm switch Snu1. No losses are generated in the upper arm switch Spu2 as no drive current flows through the upper arm switch Spu2. Only the conduction loss is generated in the lower arm switch Snu2.

The conduction loss increases with increasing amount of current. In the first-B power conversion control, an amount of drive current flowing through the upper arm switch Spu1 and the lower arm switch Snu1 is distributed, where an amount of drive current flowing through each of the upper arm switch Spu1 and the lower arm switch Snu1 is smaller than an amount of drive current flowing through the lower arm switch Snu2. The proportion of the amount of drive current through each of the upper arm switch Spu1 and the lower arm switch Snu1 depends on the duty cycle. Therefore, in the first-B power conversion control, the conduction loss generated in each of the upper arm switch Spu1 and the lower arm switch Snu1 is smaller than the conduction loss generated in the lower arm switch Snu2.

Figure 7A:
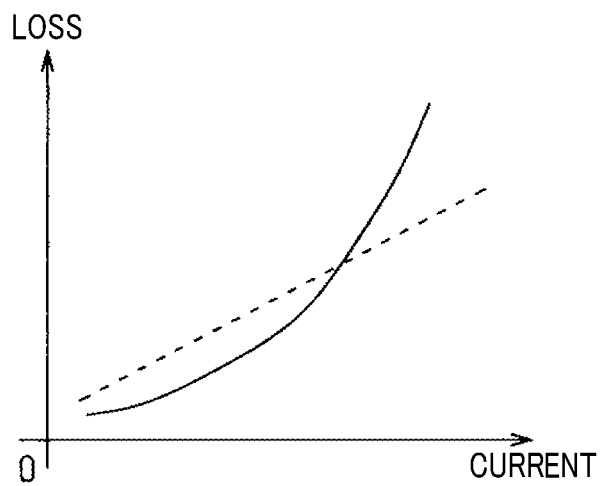
FIG. 7A is a comparison between switching and conduction losses.

The switching loss and the conduction loss both increase as the amount of current increases, but they increase differently. That is, as illustrated in FIG. 7A, the switching loss increases linearly in proportion to the amount of current while the conduction loss increases in proportion to the square of the amount of current, as if it exponentially increased. In FIG. 7A, the switching loss is indicated by the broken line and the conduction loss is indicated by the solid line.

Figure 7B:
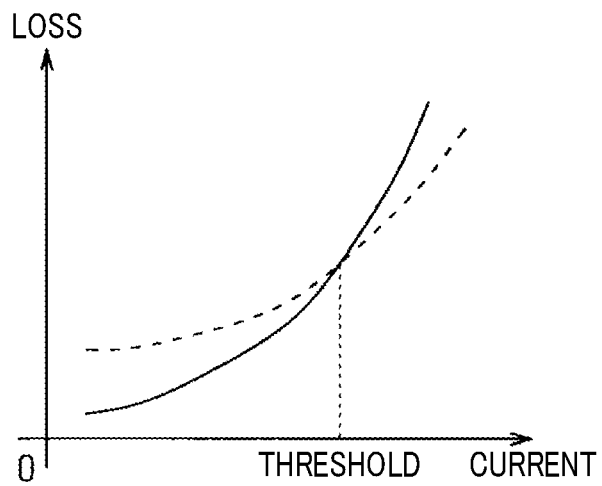
FIG. 7B is a comparison of losses generated in respective switching elements.

Thus, as illustrated in FIG. 7B, the loss (that is the switching loss plus the conduction loss) generated in each of the switching elements whose open/closed states are switched is larger than the loss generated in the switching element that is locked in the closed state (the conduction loss only) when the amount of current is small. In FIG. 7B, the loss in each of the switching elements whose open/closed states are switched is indicated by the broken line, and the loss in the switching element that is locked in the closed state is indicated by the solid line.

When a certain amount of current is exceeded, the conduction loss increases exponentially. Thus, the loss generated in the switching element that is locked in the closed state become larger than the loss generated in each of the switching elements whose open/closed states are switched.

That is, as illustrated in FIG. 7B, when the effective value of drive current is equal to or greater than the threshold, the loss generated in the switching element that is locked in the closed state is equal to or larger than the loss (the switching loss plus the conduction loss) generated in each of the switching elements whose open/closed states are switched. More specifically, as illustrated in FIG. 6B, when the amount of current is large in the first-B power conversion control, the loss generated in the lower arm switch Snu2 is larger than the loss generated in each of the upper arm switch Spu1 and the lower arm switch Snu1. That is, the temperature of the lower arm switch Snu2 becomes significantly higher than temperatures of the other switching elements. When the losses (heat generation) are concentrated in this way, the circuit grows in size, e.g., a cooling structure grows in size, which may lead to disadvantages.

Therefore, the controller 60 in the present embodiment switches between the first power conversion control and the second power conversion control when the effective value of drive current is equal to or greater than the threshold such that the heat generation is not concentrated in some of the switching elements.

The threshold is set based on the effective value of drive current at which the conduction loss generated in the switching element that is locked in the closed state exceeds the total loss (the switching loss plus the conduction loss) generated in each of the switching elements whose open/closed states are switched. More specifically, as illustrated in FIG. 7B, the threshold is set to the effective value of drive current at which the total value of the switching loss and the conduction loss in each of the switching elements whose open/closed states are switched and the conduction loss in the switching element that is locked in the closed state are substantially equal to each other. The threshold is not limited to such a value, and may be arbitrarily changed.

Figure 8:
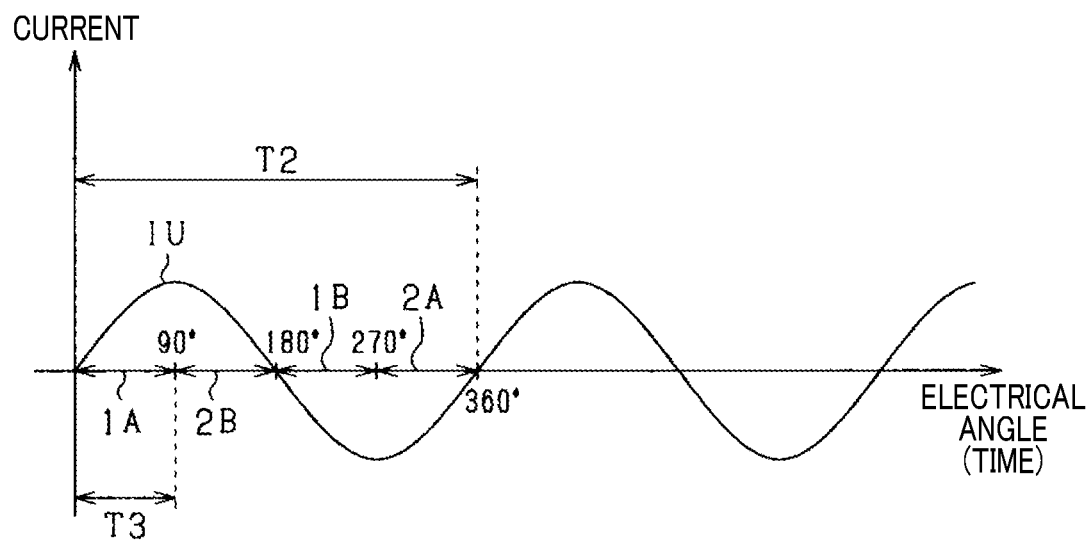
FIG. 8 is an illustration of a switching period.

As illustrated in FIG. 8, a switching period T3 is set such that the duration of the first power conversion control and the duration of the second power conversion control are equal within a current-flow period (or a period of current) T2 of the drive current. In the present embodiment, a time period corresponding to ¼ of the current-flow period T2 of the drive current is set as the switching period T3. That is, the first power conversion control and the second power conversion control are switched each time the electrical angle advances 90 degrees.

For example, the controller 60 performs the first-A power conversion control (indicated by "1A" in FIG. 8) for the period from the beginning of the current-flow period T2 of the drive current to the advance of the electrical angle of 90 degrees. Then, the controller 60 performs the second-B power conversion control (indicated by "2B" in FIG. 8) for the period in which the electrical angle advances from 90 degrees to 180 degrees within the current-flow period T2 of the drive current. The controller 60 performs the first-B power conversion control (indicated by "1B" in FIG. 8) for the period in which the electrical angle advances from 180 degrees to 270 degrees within the current-flow period T2 of the drive current. The controller 60 performs the second-A power conversion control (indicated by "2A" in FIG. 8) for the period in which the electrical angle advances from 270 degrees to 360 degrees within the current-flow period T2 of the drive current.

The controller 60 performs only the first power conversion control when the effective value of drive current is less than the threshold. As described above, when the effective value of drive current is less than the threshold, the conduction loss in the switching element locked in the closed state is smaller than and does not exceed the total value of the switching loss and the conduction loss in each of the switching elements whose open/closed states are switched (see FIG. 6A). Therefore, it does not make much sense to switch between the first power conversion control and the second power conversion control and distribute the losses. If the first power conversion control and the second power conversion control are switched, the switching losses will be generated in overlap and the overall efficiency will decrease (that is, the overall loss will increase).

Therefore, the controller 60 in the present embodiment performs only the first power conversion control when the effective value of drive current is less than the threshold. In an alternative embodiment, when the effective value of drive current is less than the threshold, only the second power conversion control, instead of the first power conversion control, may be performed.

Figure 9A:
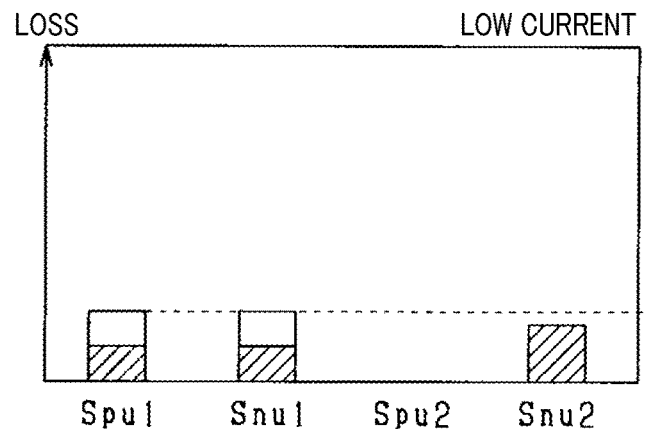
FIGS. 9A and 9B are an illustration of losses generated in respective switching elements.
Figure 9B:
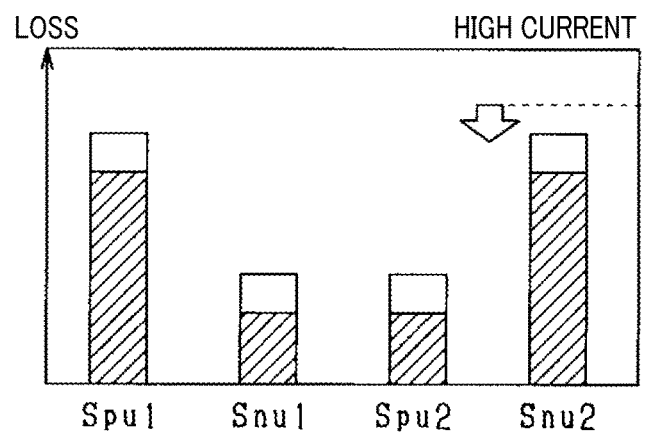

As described above, as illustrated in FIG. 9B, when the effective value of drive current is equal to or greater than the threshold, switching of the power conversion control can prevent the conduction loss from being concentrated in one of the switching elements in the inverter circuits 51 and 52 while the switching losses are generated in the respective switching elements in the inverter circuits 51 and 52. That is, when the effective value of drive current is equal to or greater than the threshold, it is possible to distribute the drive current and thereby distribute the conduction losses. As illustrated in FIG. 9A, when the effective value of drive current is less than the threshold, only the first power conversion control is performed.

Figure 10:
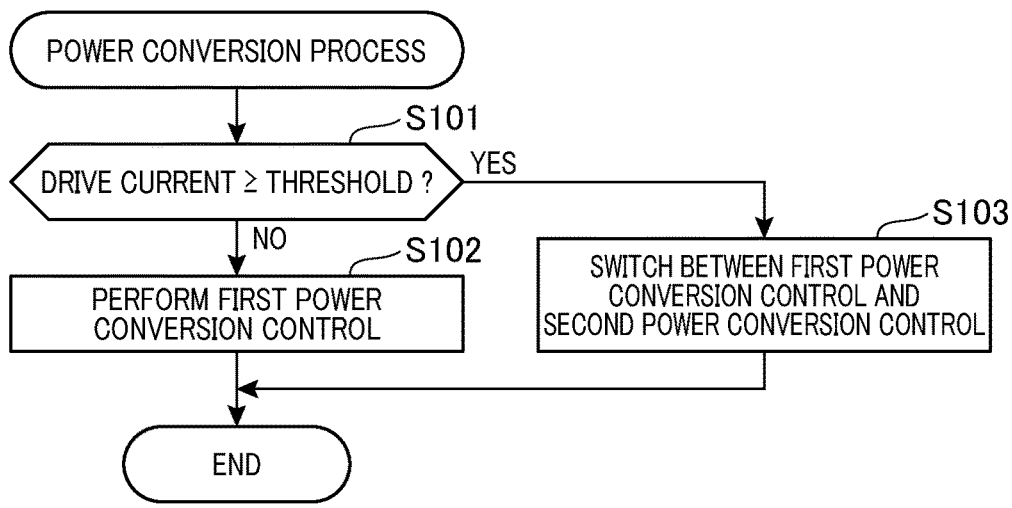
FIG. 10 is a flowchart of a power conversion process.

The power conversion process will now be described with reference to FIG. 10. This power conversion process is performed by the controller 60 every predetermined time interval when driving the motor 40.

First, the controller 60 determines whether the effective value of drive current is equal to or greater than the threshold (at step S101). If the answer is "NO", the controller 60 performs the first power conversion control (at step S102). At step S102, when reversing the direction of the drive current, the controller 60 switches between the first-A power conversion control and the first-B power conversion control.

If the answer is "YES" at step S101, the controller 60 switches between the first power conversion control and the second power conversion control every predetermined switching period T3 (at step S103). At step S102, when the current direction of the drive current is positive, the first-A power conversion control and the first-B power conversion control will be switched, and when the current direction of the drive current is negative, the first-B power conversion control and the second-A power conversion control will be switched. The switching period T3 is a period corresponding to ¼ of the current-flow period T2. Therefore, the power conversion control is switched in the order of the first-A power conversion control→the second-B power conversion control→the first-B power conversion control→the second-A power conversion control depending on the period of the drive current.

The present embodiment can provide the following advantages.

When switching between the first power conversion control and the second power conversion control, extra losses may be generated due to switching timing misalignment, that is, due to the presence of the overlap time period T1 in which switchings overlap. When the switching element is locked in the closed state, the conduction loss increases in proportion to the square of the current, and when the effective value of drive current equal to or greater than the threshold, the temperature of the switching element that is locked in the closed state may become extremely high as compared with temperatures of other switching elements whose open/closed states are switched.

To address such an issue, when the effective value of drive current is equal to or greater than the threshold, the controller 60 switches between the first power conversion control and the second power conversion control to change the switching element to be locked in the closed state, thereby preventing concentration of heat generation. When the effective value of drive current is less than the threshold, the controller 60 performs either the first power conversion control or the second power conversion control to suppress the losses that are generated upon switching of the power conversion control.

The switching loss increases linearly in proportion to the amount of current. On the other hand, the conduction loss increases in proportion to the square of the current, and increases sharply as compared with the switching loss after a certain current is reached. Therefore, the threshold is set based on the effective value of drive current at which the conduction loss generated in the switching element that is locked in the closed state exceeds the total loss (the switching loss plus the conduction loss) generated in each of the switching elements whose open/closed states are switched. This enables appropriate distribution of the conduction loss generated in the switching element that is locked in the closed state, thereby preventing the switching element that is locked in the closed state from becoming hotter than the other switching elements.

When the effective value of drive current is equal to or greater than the threshold, the controller 60 switches between the first power conversion control and the second power conversion control such that the duration of the first power conversion control and the duration of the second power conversion control becomes equal during each period of the drive current. This enables appropriate distribution of the losses, thereby preventing the temperature of some of the switching elements from becoming extremely high. In the present embodiments, when the effective value of drive current is equal to or greater than the threshold, the controller 60 switches between the first power conversion control and the second power conversion control every time interval corresponding to ¼ of the current-flow period T2 of the drive current. This enables equalization of the duration between the first power conversion control and the second power conversion control while minimizing the number of switchings during each current-flow period. Therefore, it is possible to distribute the losses while suppressing the switching losses during the overlap time period T1.

When the effective value of drive current is equal to or greater than the threshold, the controller 60 performs the first-A power conversion control→the second-B power conversion control→the first-B power conversion control→the second-A power conversion control in this order. Therefore, losses can be generated evenly between the respective switching elements in the inverter circuits 51 and 52.

Other Embodiments

The present disclosure is not limited to the above-described embodiment. Various modifications are possible without departing from the spirit of the present disclosure. In order to facilitate understanding of the description, the same structural elements in the drawings share the same reference signs wherever possible, and overlapping description is omitted.

(M1) In the above embodiment, the switching period T3 may be arbitrarily changed as long as the duration of the first power conversion control and the duration of the second power conversion control are equal. For example, it may be 1/(4X) of the current-flow period T2 of drive current (where X is an arbitrary positive integer).

However, the first-A power conversion control and the first-B power conversion control are switched depending on the direction of the drive current (the same applies to the second-A power conversion control and the second-B power conversion control). Therefore, when the direction of the drive current is positive, the first-A power conversion control and the second-B power conversion control are alternately performed every switching period T3. When the direction of the drive current is negative, the first-B power conversion control and the second-A power conversion control are alternately performed every switching period T3.

(M2) In the above embodiment, the circuit configuration of the inverter 50 may be arbitrarily modified. For example, either the positive bus Bp or the negative bus Bn may be provided with a switch for switching between the conducting state (or an on state, a closed state) and the nonconducting state (or an off state, an open state) between the second inverter circuit 52 and the battery 30.

Figure 11:
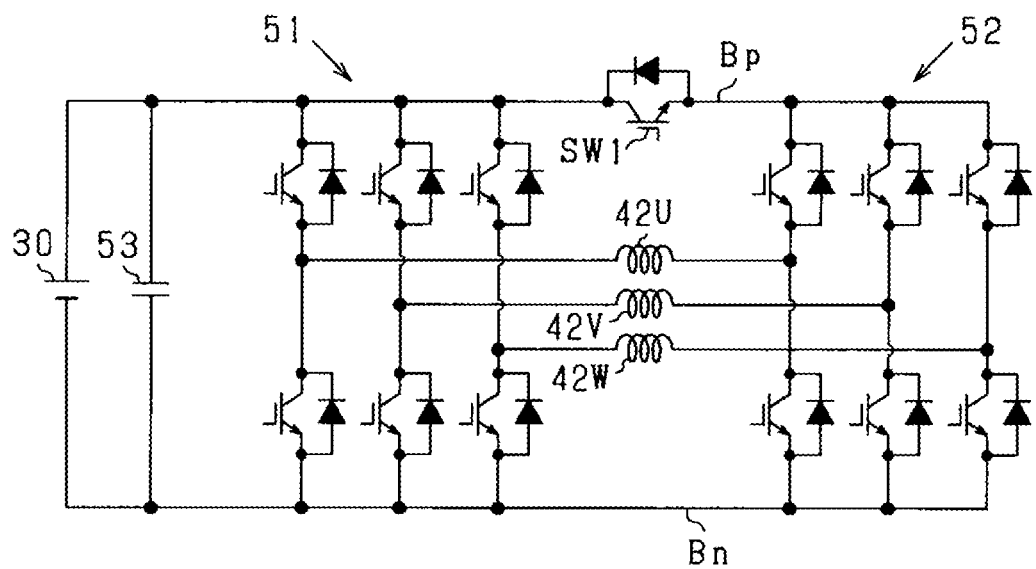
FIG. 11 is a circuit diagram illustrating another electric configuration of the ISG.

For example, as illustrated in FIG. 11, the positive bus Bp may be provided with a switch for switching between the conducting state and the nonconducting state between the second inverter circuit 52 and the battery 30. Placing the switch SW1 in the open state (i.e., the off state or the nonconducting state) and thereby disconnecting between the second inverter circuit 52 and the battery 30 enables switching from H-connection to Y-connection (i.e., star connection).

In such a circuit configuration, when the current is passed through the switch SW1, a conduction loss will be generated in the switch SW1. Therefore, it is preferable from the viewpoint of efficiency that the current does not flow through the switch SW1 as much as possible. Hence, in such a circuit configuration, the controller 60 switches the switch SW1 to the nonconducting state when the effective value of drive current is less than the threshold, and performs the first power conversion control among the first power conversion control and the second power conversion control, which can reduce losses.

Figure 12:
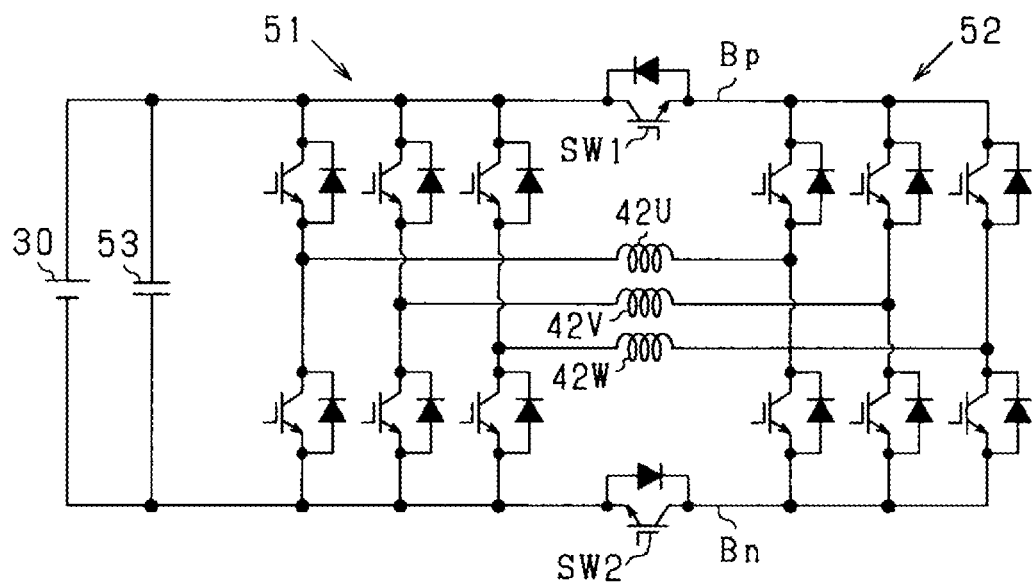
FIG. 12 is a circuit diagram illustrating another electric configuration of the ISG.

(M3) In the above embodiment, as illustrated in FIG. 12, the positive bus Bp and the negative bus Bn may be provided with switches SW1 and SW2, respectively, for switching between the conducting state and the nonconducting state between the second inverter circuit 52 and the battery 30. Placing the switches SW1 and SW2 in the open state (i.e., the off state or the nonconducting state) and thereby disconnecting between the second inverter circuit 52 and the battery 30 enables switching from H-connection to Y-connection. It should be noted that placing the switch SW1 along the positive bus Bp in the open state allows for a neutral point on the high-potential terminal side. Similarly, placing the switch SW2 along the negative bus Bn in the open state allows for a neutral point on the low-potential terminal side.

(M4) In the above embodiment, the controller 60 may determine whether the effective value of drive current is equal to or greater than the threshold based on the temperature of the inverter circuits 51 and 52 (more specifically, the temperature of the switching elements). That is, the effective value of drive current is proportional to temperature. Therefore, it may be determined, based on the temperature, whether the effective value of drive current is equal to or greater than the threshold. The controller 60 may determine, based on a command value of the drive current, whether the effective value of drive current is equal to or greater than the threshold.

(M5) In the above embodiment, the current waveform of the drive current may be arbitrarily changed. The current waveform of the drive current may be a rectangular waveform, a sawtooth waveform or the like.

In the above embodiments and modifications, the controller and the method thereof described in the present disclosure may be implemented by a special purpose computer which is configured with a memory and a processor programmed to execute one or more particular functions embodied in computer programs of the memory. Alternatively, the controller described in the present disclosure and the method thereof may be implemented by a dedicated computer configured as a processor with one or more dedicated hardware logic circuits. Alternatively, the control circuit and method described in the present disclosure may be implemented by one or more dedicated computer, which is configured as a combination of a processor and a memory, which are programmed to perform one or more functions, and a processor which is configured with one or more hardware logic circuits. The computer program may also be stored on a computer readable non-transitory tangible storage medium as instructions to be executed by a computer.

The disclosure in this specification, the drawings, and the like is not limited to the illustrated embodiments. The disclosure encompasses the illustrated embodiments and variations thereof by those skilled in the art. For example, the present disclosure is not limited to the combinations of components and/or elements shown in the embodiments. The present disclosure may be implemented in various combinations. The present disclosure may have additional portions which may be added to the embodiments. The present disclosure encompasses omission of the components and/or elements of the embodiments. The present disclosure encompasses the replacement or combination of components and/or elements between one embodiment and another. The disclosed technical scope is not limited to the description of the embodiments. Several technical scopes disclosed are indicated by descriptions in the claims and should be understood to include all modifications within the meaning and scope equivalent to the descriptions in the claims.

The present disclosure is described in compliance with the embodiments. However, it should be appreciated that the present disclosure is not limited to the embodiments or the structures thereof. The present disclosure encompasses various modified examples and modifications within the range of equivalency. In addition, the scope of the present disclosure and the range of ideas thereof include various combinations and forms and other combinations and forms additionally including one or more elements or a portion of one element.

What is claimed is:

1. A power converter for converting direct-current (DC) power from a DC power source into alternating-current (AC) power and supplying the AC power to a single-phase winding or multi-phase windings, the power converter comprising:
    a first inverter circuit configured to be electrically connected to a first end of each winding and configured to transfer electrical power from the DC power source to the first end of the winding;
    a second inverter circuit configured to be electrically connected to a second end of each winding and configured to transfer electrical power from the DC power source to the second end of the winding; and a controller configured to control the first inverter circuit and the second inverter circuit and operable to perform first power conversion control to lock open/closed states of switching elements in the second inverter circuit and switch open/closed states of switching elements in the first inverter circuit, and second power conversion control to lock open/closed states of switching elements in the first inverter circuit and switch open/closed states of switching elements in the second inverter circuit, the controller being configured to perform either the first power conversion control or the second power conversion control when an effective value of drive current through each winding is less than a threshold, and switch between the first power conversion control and the second power conversion control when the effective value of drive current through each winding is equal to or greater than the threshold.

2. The power converter according to claim 1, wherein the threshold is set based on the effective value of drive current at which a conduction loss generated in the switching element that is locked in a closed state reaches or exceeds a total value of a switching loss and a conduction loss generated in each of the switching elements whose open/closed states are switched.

3. The power converter according to claim 1, wherein the controller is configured to, when the effective value of drive current is equal to or greater than the threshold, switch between the first power conversion control and the second power conversion control such that a duration of the first power conversion control and the duration of the second power conversion control are equal within each period of the drive current.

4. The power converter according to claim 1, wherein the controller is configured to determine whether the effective value of drive current is equal to or greater than the threshold, based on a temperature of at least one of the first inverter circuit and the second inverter circuit.

5. The power converter according to claim 1, wherein each of the first inverter circuit and the second inverter circuit is electrically connected to a positive bus connected to a positive terminal of the DC power source, each of the first inverter circuit and the second inverter circuit is electrically connected to a negative bus connected to a negative terminal of the DC power source, one of the positive bus and the negative bus is provided with a switch for switching between a conducting state and a nonconducting state between the second inverter circuit and the DC power source, and the controller is configured to, when the effective value of drive current is less than the threshold, place the switch in the nonconducting state and perform only the first power conversion control among the first power conversion control and the second power conversion control.

6. The power converter according to claim 1, wherein each of the first inverter circuit and the second inverter circuit comprises a series connection of an upper arm switch and a lower arm switch for each phase, the first power conversion control comprises first-A power conversion control in which open/closed states of the upper arm switch and the lower arm switch in the first inverter circuit are switched while the upper arm switch in the second inverter circuit is locked in a closed state, and first-B power conversion control in which open/closed states of the upper arm switch and the lower arm switch in the first inverter circuit are switched while the lower arm switch in the second inverter circuit is locked in the closed state, the second power conversion control comprises second-A power conversion control in which open/closed states of the upper arm switch and the lower arm switch in the second inverter circuit are switched while the upper arm switch in the first inverter circuit is locked in the closed state, and second-B power conversion control in which open/closed states of the upper arm switch and the lower arm switch in the second inverter circuit are switched while the lower arm switch in the first inverter circuit is locked in the closed state, the controller is configured to, when the effective value of drive current is less than the threshold, switch between the first-A power conversion control and the first-B power conversion control or between the second-A power conversion control and the second-B power conversion control, and when the effective value of drive current is equal to or greater than the threshold, performs the first-A power conversion control, the second-B power conversion control, the first-B power conversion control, and the second-A power conversion control in this order.

* * * * *